Jan. 14, 1969 C. R. PERRY 3,422,028
EMULSION TREATER
Filed Jan. 3, 1967 Sheet 2 of 2
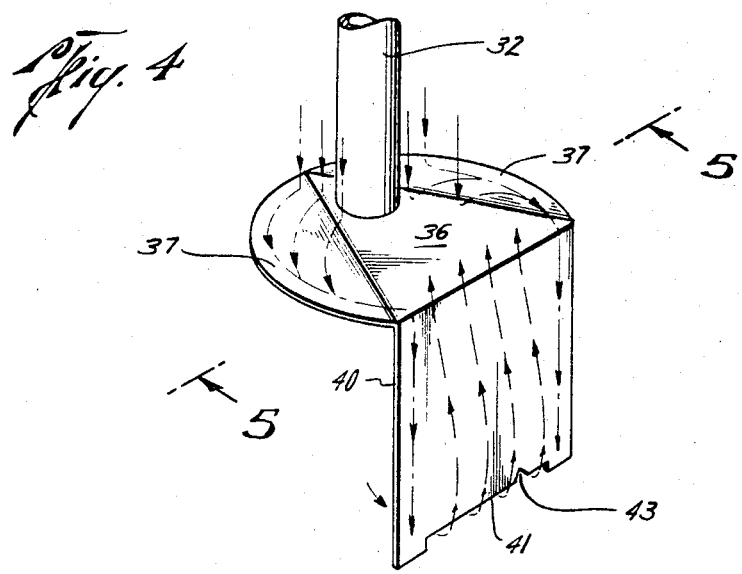
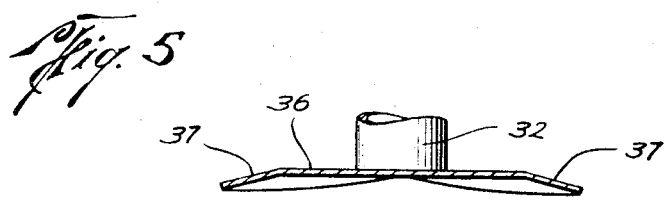
Charles R. Perry
INVENTOR

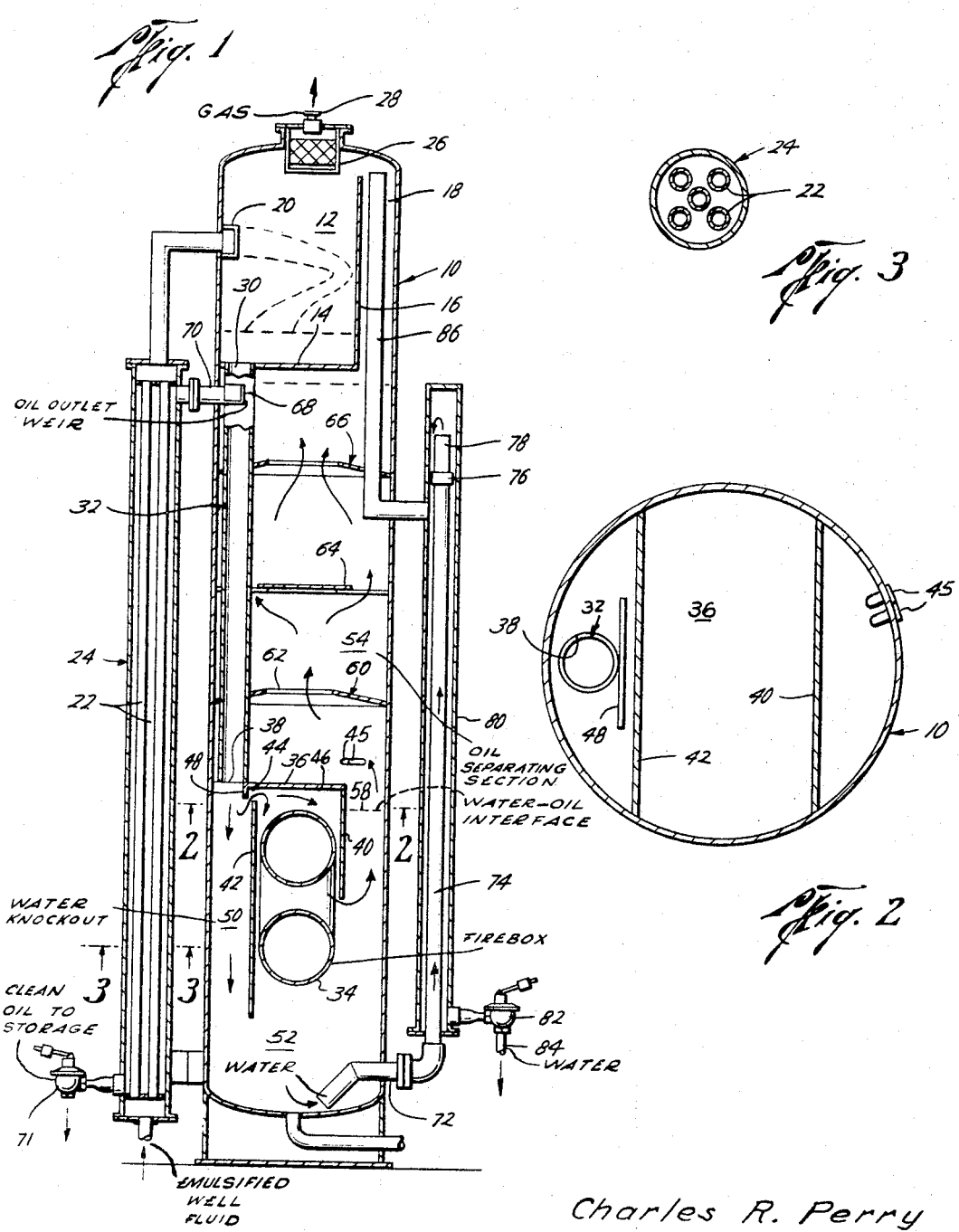

United States Patent Office 3,422,028
Patented Jan. 14, 1969

3,422,028
EMULSION TREATER
Charles R. Perry, Odessa, Tex., assignor to Sivalls Tanks, Inc., Odessa, Tex.
Filed Jan. 3, 1967, Ser. No. 607,037
U.S. Cl. 252—362                 11 Claims
Int. Cl. B01d *17/04;* B01d *19/02*

ABSTRACT OF THE DISCLOSURE

A well fluid water-oil emulsion is tangentially admitted into the top of a tower from which gases are centrifuged and exhausted. The emulsion is then conveyed by a vertical conduit to a water knockout box in the bottom of the tower while emulsion is laterally removed from the box to a heater for further separation of water and oil. The oil rises from the heater into the central oil separating section of the tower and is removed near the top of the tower. Water is removed from the tower bottom.

---

This invention relates to an emulsion treater and, more particularly, to an improved emulsion treater for the separation of well fluids into oil, gas and water phases.

In many instances, well fluids from oil and gas wells consist of a mixture of oil, emulsion, water and natural gas. The water is often in an emulsion known as a "tight" emulsion which is difficult to separate into oil and water. In most cases, however, the well fluids also include portions which may be termed "free water" in an emulsion which may be easily broken up to separate the water by agitation and gravity settling.

The tight emulsions require heating for effective separation and many treaters have been designed for this purpose. Such treaters heretofore employed, however, are wasteful from a fuel standpoint as their construction is such that not only the tight emulsion but also at least a substantial portion of the free water is heated.

It is conventional practice in vertical treaters of this general type to conduct the emulsified fluids downwardly in a tower and direct their flow to a point where they may flow upwardly over a heater in the tower and thereby effect separation of the fluids into their oil and water phases. After heating, the separated phases may settle in a relatively quiescent zone above the heater for effecting further separation prior to disposal from the tower. Heating of the emulsified fluids will also release a certain amount of gas, which naturally bubbles up through and agitates the settling fluids, thereby upsetting the quiescence essential to efficient gravity separation.

It has been found that flow of the liquids over the heater in this conventional manner results in an unusually high rate of deposition of lime and other caking material on the heater surfaces. The deposition and caking result in deleterious effects.

Deposition is thought to be due principally to the direction of the flow of liquid upwardly over the heater. That is, water rather than oil is known to be the source of carbonaceous deposits and, since the water is first flowed upwardly over the heater and then settles downwardly thereover after separation from the oil, it will be appreciated that considerable time is permitted in which deposits may form.

In order to greatly reduce water contact with the heater, and thereby eliminate many of the disadvantages resulting from flowing the emulsion upward over the heater, Lovelady et al., U.S. Patent 2,832,431, granted Apr. 29, 1958, discloses a vertical emulsion treater in which the emulsion is caused to flow downwardly over the heater. Provisions were also included whereby gas released during the heating would flow through the downcomer where the heavy hydrocarbons could be recaptured, enriching the oil and preventing agitation from gas in the settling section. Emulsion treaters constructed in accordance with the teachings of this patent have been used successfully to treat greater capacities of well fluid at lower treating temperatures. Perry, U.S. Patent 3,029,580, granted Apr. 17, 1962, utilized the advantages of aforesaid mentioned Patent 2,832,431 and achieved even lower operating temperatures by flowing the emulsion downward over and in direct contact with the high temperature walls of the heater in a zone of greatly restricted cross section defined by a hood enclosing a major portion of the heater, discharging treating emulsion underneath the edge of the hood and immediately flowing it upward through hot water into a settling zone.

While the emulsion treater disclosed in Patent 3,029,580 has been particularly successful for breaking tight emulsions containing very little free water, it was found that when the emulsified well fluids contain a substantial portion of free water that the efficiency of the emulsion treater dropped due to the fact that the entire stream of emulsion and free water is directly exposed to the heater, resulting in free water being heated equally with the emulsion. Accordingly, it is an object of the present invention to provide an improved vertical emulsion treater in which the free water is separated from the emulsion prior to the emulsion flowing downward over the heater in a restricted zone.

It is another object to provide an emulsion treater in which the free water has a full opportunity to settle out of the emulsion into a large water settling section prior to the remaining tight emulsion being exposed to the heater.

It is another object to provide a vertical emulsion treater having a downcomer sized to settle out the free water into the lower section of the tower and then flowing the separated emulsion downward over the restricted heating zone.

It is another object to provide an emulsion treater wherein the emulsion and water is flowed into a free water knockout zone adjacent a large water settling section in which the free water is separated out of the emulsion prior to the heating of the emulsion.

It is a further object to provide a down-flow emulsion treater in which the free water is separated in a free water knockout compartment at the bottom of the treater and the remaining tight emulsion is conducted laterally into a restricted zone around a heater over which the tight emulsion flows downwardly.

Other objects, advantages and features of this invention will be apparent to one skilled in the art and upon a consideration of the written specification, the attached claims and annexed drawings.

In the drawings, wherein like reference characters are used throughout to designate like parts:

FIG. 1 is a vertical section through a preferred embodiment of the present invention.

FIG. 2 is a cross-section view taken generally along lines 2—2 of FIG. 1.

FIG. 3 is a cross-section view taken generally along lines 3—3 of FIG. 1

FIG. 4 is an isometric of an alternative construction for the hood surrounding the heater.

FIG. 5 is a cross-section view taken generally along lines 5—5 of FIG. 4.

Turning now to a description of the embodiment of the invention illustrated in the drawing, it can be seen that the emulsion treater comprises a substantially upright cylindrical tank 10 which is preferably constructed of mild steel plate and has sufficient strength to withstand operating pressures which ordinarly are in the order of 25 p.s.i. A gas separating chamber designated generally by the numeral 12 is disposed in the upper part of the tower 10. The gas separating chamber 12 is defined by a bottom plate 14 and a vertical wall 16 at the upper end of the tower. Chamber 12 thus substantially fills the entire upper end of the tower 10 except for a small area 18 determined by wall 16 and the corresponding arc of the tower wall. Wall 16 does not extend to the top of the tower, but ends some distance from the top, thus leaving a passage for gases to flow upward outside of the wall into the chamber 12.

Emulsified well fluid enters the tower 10 through a tangential inlet 20. If desired, the emulsified well fluid may first be passed through conduits 22 of vertical heat exchanger 24, which heat the cold emulsified well fluid to a certain extent. The inlet 20 is designed to direct the emulsified well fluid tangentially upon the inner wall of the gas separating chamber 12. The emulsified well fluid follows a spiral path around the chamber 12. By following a spiral path, the emulsified well fluid is spread out in a very thin layer and, being subject to the centrifugal force, the easily removable petroleum gas is freed. The gas separated from the emulsified well fluid flows to the upper end of the tower and through a suitable wire mesh mist extractor 26 into gas outlet line 28.

After flowing around the vertical walls of the gas separating chamber 12, the emulsified well fluid spreads over the bottom plate 14 allowing more gas to separate from the mixture. An opening 30 is provided in the bottom plate 14 adjacent the wall of the tower. A vertical emulsion conductor pipe or downcomer 32 extending downwardly along the side of the tower 10 communicates with the opening 30. The emulsified well fluid in the gas separating chamber 12 flows out through the opening 30 into the downcomer 32.

Located in the lower part of the tower is a firebox forming the heater 34 for the emulsion treater. Disposed above the firebox 34 is a laterally extending plate 36 having an opening 38 which receives the bottom of the emulsion conductor pipe 32. The plate 36 extends laterally across the tower past the firebox 34 where it joins a vertical plate 40 located along one side of the firebox 34. A second vertical plate 42 is located along the other side of the firebox 34. The second plate 42 is separated from the bottom of the laterally extending plate 36 by an opening 44, and extends downwardly past the bottom of the firebox 34. The laterally extending plate 36, together with the two vertical plates 40 and 42 form a closed top and open bottom enclosure means or hood surrounding a major upper part of the firebox 34 to provide a laterally restricted zone 46 therearound. The only entrance to the restricted zone 46 or hood is through the space 44 between the second vertical plate 42 and the laterally extending plate 36 or through the open bottom. To prevent the emulsion flowing down through the emulsion conductor pipe 32 from flowing directly into the hood through the space 44, a baffle 48 extends downwardly from the bottom of the laterally extending plate 36 adjacent the opening 44.

The oil, water and emulsion mixture contained in the inlet chamber 12 flows down through the emulsion conductor pipe 32 into the area defined by the second vertical plate 42 and the arc of the wall tower which forms the free water knock-out by-pass area 50. The free water, usually in the form of droplets, being of a higher gravity than the emulsion, continues downwardly through the freewater knock-out by-pass area 50 into the lower part of the tower forming the free water settling section 52 of the treater. The cross sectional area of the free water knock-out compartment 50 is such as to provide that the maximum downward velocity of free water is not greater than two feet per minute. Therefore, the emulsion and oil have adequate time to be separated from the free water and are not entrained with the free water flowing into the water settling section 52 of the treater.

The emulsion being lighter than the free water rises upwardly in the free water knock-out area 50 and flows through the opening 44 into the restricted heating zone 46. The baffle 48 prevents the emulsion from flowing directly into the restricted heating zone 46 and thereby reduces the likelihood of free water flowing with the emulsion into restricted heating zone 46. The oil and emulsion which rises in the free water knock-out by-pass compartment 50 flow into the restricted heating zone through the opening 44. The tight emulsion then flows over the firebox 34, passing downward over the firebox then under the firebox hood and upward into the settling section 54 of the treater.

The downward passage of the emulsion over the firebox produces a washing action to remove scale, sediment and stagnant fluid from the firebox 34 which results in extension of the firebox life and a reduction of firebox corrosion. Inasmuch as the emulsion passes over the firebox in a restricted zone, there is an application of heat to the emulsion in a confined area which causes the water in the tight emulsion to coalesce rapidly into large droplets, resulting in lower treating temperatures, reduced fuel gas consumption, reduced chemical consumption and greater operating capacity.

Any gas which is driven from the emulsion by heating flows back through the space 44 around the baffle 48 and back up through the emulsion conductor pipe 32. Heavy hydrocarbon vapors are reabsorbed from the gas and held in the oil. This results in a conservation of volume and gravity of clean oil and also prevents the release gas from rising through the oil settling section, as will be described subsequently.

By settling out the free water prior to subjecting the tight emulsion to the application of heat, lower overall treating temperatures are maintained which results in the reduction of corrosion and scaling and an increase in oil gravity. The free water knock-out by-pass allows free water to by-pass the firebox compartment and thus never be heated. This increases the capacity of the treater when processing streams containing large quantities of water since the free water which is by-passed does not absorb heat from the firebox. Therefore, the firebox only has to apply heat to the tight emulsion and the temperature of the treater can be reduced inasmuch as the heater 34 does not have to apply heat to the free water. Also, by not heating the free water, corrosion and scale are greatly reduced. Moreover, the tight emulsion in flowing downward over the heater 34 will tend to rinse off any sediment before it has an opportunity to harden and cake.

The free water knock-out by-pass compartment is sized to provide an ample opportunity for the free water to settle out without carrying entrained emulsion with it. However, if some entrained emulsion does flow into the water settling section 54, the emulsion will rise in the vicinity of the firebox 34 and be heated thereby.

The firebox 34 may be of U-shaped construction, and, if desired, formed of two parts secured together at the bend. The lower edge of the vertical wall 40 extends down to approximately midway between the two legs of the firebox 34. While the water-oil interface is maintained by hydraulic balance to level 58 located below the lateral extending plate 36, emulsion will be located under the hood. Therefore, the free water level will be just above the bottom edge of the vertical wall 40. Accordingly, the lower leg of the firebox will be exposed to water, and, therefore, subject to more severe corrosion than the upper leg. Therefore, if the firebox is constructed of two parts, it will be possible to more easily and cheaply replace the lower leg when it is necessary to do so.

As mentioned, the oil-water interface is maintained at the level 58; however, the tight emulsion in the free water knock-out compartment 42 will flow through the opening 44 and into the restricted zone 46 under the hood. The emulsion flows downwardly over the heater 34. Application of heat to the emulsion in the restricted zone causes rapid coalesence of water droplets which will drop rapidly into the water settling section 52. The heated emulsion will flow under the bottom edge of the vertical plate 40 and into the oil settling section 54.

Gas separated from the oil as a result of heating the tight emulsion in the restricted zone 46 will flow back through the opening 44 and rises through emulsion conductor conduit 32 counter current to the cold inlet emulsion stream. As a result, the heavier hydrocarbon gases will be absorbed by the incoming emulsion and the lighter vapors will be stripped therefrom. Also, the liberated gas will not rise through the oil settling section causing turbulence therein.

The heated emulsion flowing under the lip of vertical plate 40 will rise into the settling section 54. The oil rising through the settling section 54 is directed first toward the center of the tower by a conical baffle 60.

The conical baffle 60 has a large central opening 62 and is of such size as to leave a small space between its outer edge and the wall of the tower. It is disposed above the firebox and above the oil-water interface 58. Above the conical baffle 60 is a flat disc baffle 64 which directs the oil toward the shell of the tower 10. The upward flow is then directed back toward the center of the tower by a second conical baffle 66 installed in the upper part of the tower. The second conical baffle also has a large central opening and extends outward almost to the wall of the tower.

The series of baffles prevents channeling of the oil through the settling section 54 and assures maximum retention time. If the emulsified well fluid being treated is of extremely tight emulsion a filter may be incorporated in the settling section to further aid in coalescing water out of the tight emulsion.

Water separated in the settling section 54 settles to the top of one of the two conical baffles 60, 66. The slope of the baffles causes the water to flow to the inner wall of the tower from where it drains to the water settling section 52. Accordingly, separated water does not flow back through the oil settling section 54. Also, since separated water drains along the inner wall of the tower, most heat loss is from the separated water and not from the oil in the oil settling section.

FIG. 4 illustrates a construction whereby any water settling on top of horizontal plate 36 is directed to the shell of the treater 10. As can be seen, the plate 36 is bent slightly on each edge 37, therefore, any water on top of plate 36 will tend to flow toward the shell. Also, the vertical plate 40 is provided with a notch 41 across the center of its bottom edge, and a dribble notch 43 which is in line with the thermostat and temperature controller 45 of the treater 10. The notch 41 tends to direct the rising emulsion and oil to the center of passageway formed by the vertical plate 40 and shell of the treater 10. The notch 43 is incorporated to assure that the emulsion will rise in the vicinity of the thermostat and thermometer 45 even when the treater 10 is not perfectly leveled.

An oil outlet weir 68 is installed in the upper part of the tower and an outlet 70 for the oil communicates with the space between the wall of the tower and the weir 68. The outlet 70 may be connected to shell side of the heat exchanger 24. Clean oil then flows through the heat exchanger 24 through an oil valve 71 and to storage tanks.

A water outlet line 72 communicates with the lower part of the tower and conducts water to a vertical line 74 which is connected to a nipple 78 by a union 76. The nipple 78 and union 76 provide a means for adjusting the height of the interface and provides a means for balancing the static head within the tower by suitable adjustment of the nipple 78 and union 76. Water overflows continually from the top of the nipple 78 and flows into an outer jacket 80 from whence it is withdrawn by a control valve 82 and outlet line 84. The upper part of the jacket 80 communicates with the interior of the gas separation chamber by a tube 86, thus equalizing pressure in the jacket 80 with that in the chamber 12.

Where there are large quantities of water but very loose emulsions, such as in waterflood and water drive reservoirs, the baffles, filter and mist extractor may be eliminated.

As can be seen from the foregoing, the present invention provides an emulsion treater which is capable of handling large quantities of emulsified well fluid at low operating temperatures. In one test installation involving a 4' x 22' treater, the treater handled in excess of 1500 barrels of water per day in addition to 200 barrels of oil per day. The heating temperature was easily maintained by the firebox, with the burner firing less than 25% of the time.

By providing a free water knockout compartment wherein the emulsion can easily settle out and flow into the restricted heating zone, an overall lower heating temperature can be maintained since only the emulsion has to be heated. Moreover, the capacity of the treater is increased when processing streams containing large quantities of free water, since such free water does not absorb heat from the heater.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An emulsion-treating apparatus comprising in combination a vertical tower; a firebox disposed in a lower part of the tower; an unheated free water settling section in the bottom of the tower below the firebox; an outlet for withdrawing water from the water settling section; an oil settling section in the tower above the firebox; a gas separating chamber above the oil settling section; means near the top of the tower for introducing emulsified well fluid in the gas separating chamber; gas outlet means for the exit of separated gas; a closed top and open bottom enclosure means surrounding a major upper part of the firebox to provide a laterally restricted space therearound, an opening in one of the side walls of the enclosure adjacent the top of the enclosure; a free water knock-out compartment formed by and between the side of the enclosure having the opening and the inner wall of the tower; an emulsion conductor conduit extending vertically through the oil settling section along the side of the tower and having the free water knockout compartment, the upper end of the conductor conduit communicating with the gas separating chamber, the lower end of the conductor conduit communicating with the top of the free water knockout compartment adjacent the opening, whereby the oil-water emulsion flows from the gas separating chamber, through the emulsion conductor conduit and into the free water knockout compartment where the free water settles out into the water settling section, the emulsion flowing from the free water knock-out compartment flowing through said opening into the enclosure around the firebox and down over the firebox, the heated emulsion flowing through the open bottom of the enclosure and upward into the oil settling section and any gas in said enclosure flowing back through said opening in said one side wall and up through said emulsion conductor conduit into said gas separator chamber; and outlet means for withdrawing clean oil from the top of the oil settling section.

2. The emulsion-treating apparatus set forth in claim 1 characterized in that the free water knock-out compartment is sized to limit the downward flow of free water whereby the entrainment of oil in the free water settling is minimized.

3. An emulsion-treating apparatus comprising in combination a vertical tower; an emulsified well fluid inlet near the top of the tower; a gas separating chamber surrounding the inlet; a gas outlet at the top of the tower, the inlet injecting the emulsified well fluid tangentially around the walls of the gas separating chamber subjecting the emulsified well fluid to centrifugal force to free the gas therefrom; an opening in the floor of the gas chamber adjacent the wall of the tower; an emulsion conductor conduit in the tower adjacent a wall thereof extending vertically through the below-mentioned oil separating section, the upper end of the conduit communicating with said opening in the chamber; a firebox disposed in the lower part of the tower; a laterally extending plate disposed above the top of the firebox and an oil settling section thereabove, the laterally extending plate extending from the side of the tower containing the conduit past the firebox but short of the opposite side of the tower wall; an opening in the laterally extending plate securing the bottom end of the conduit; a first vertical plate ertending across the tower adjacent the side of the firebox nearest said conduit and being spaced from the bottom of the laterally extending plate, forming an emulsion admitting opening adjacent the lower end of the conduit; a second vertical plate on the other side of the firebox parallel to the first plate, said second plate extending downwardly from the laterally extending plate to provide a rising oil passageway between the second plate and the tower wall entering the oil settling chamber above the laterally extending plate, the laterally extending plate and two vertical plates forming a restricted zone around the firebox, the first vertical plate and the side of the tower adjacent thereto forming a free water knock-out by-pass compartment whereby free water contained in the mixture flowing down through the conduit can settle out and emulsion will rise and flow via the emulsion admitting opening into the restricted area around the firebox where it will be heated to coalesce water from the emulsion.

4. The emulsion treater set forth in claim 3 characterized in that the cross sectional area of the free water knock-out compartment is such that the maximum downward velocity of free water is no greater than two feet per minute.

5. The emulsion treater set forth in claim 4 characterized in that the first vertical plate extends downwardly past the bottom of the firebox and the second vertical plate extends downwardly to a level approximately midway of the firebox.

6. The emulsion treater set forth in claim 5 characterized in that the bottom edge of the second vertical plate is provided with a notch to direct rising emulsion and oil to the center of the passageway formed by the second vertical plate and the side of the tower.

7. The emulsion treater set forth in claim 6 characterized in that there is a dribble notch in the notch in bottom edge of the second vertical plate to direct rising emulsion past the thermostat and temperature controller of the treater.

8. The emulsion treater set forth in claim 4 characterized in that there is a short downwardly extending vertical baffle adjacent the emulsion admitting opening into the restricted zone to substantially prevent flow of emulsion from the conductor conduit directly into the restricted zone.

9. The emulsion treater set forth in claim 4 characterized in that the tower is provided with means to maintain an oil-water interface in the tower at a level above the bottom of the second vertical plate.

10. The emulsion treater set forth in claim 9 characterized in that the said oil settling chamber above the firebox is provided with a series of baffles to aid in further coalescing of treated emulsion.

11. The emulsion treater set forth in claim 10 characterized in that the edges of the laterally extending plate are bent downwardly to direct any water falling on the plate to the shell wall of the tower.

References Cited

UNITED STATES PATENTS

| | | | |
|---|---|---|---|
| 2,181,686 | 11/1939 | Walker | 208—187 X |
| 2,995,202 | 8/1961 | Glasgow | 55—175 X |

NORMAN YUDKOFF, *Primary Examiner.*

J. SOFER, *Assisant Examiner.*

U.S. Cl. X.R.

55—175, 176